United States Patent
Jiang et al.

(10) Patent No.: US 10,826,869 B2
(45) Date of Patent: Nov. 3, 2020

(54) DOMAIN NAME RESOLUTION METHOD, SERVER AND STORAGE MEDIUM

(71) Applicant: Tencent Technology (Shenzhen) Company Limited, Shenzhen (CN)

(72) Inventors: Fengbo Jiang, Shenzhen (CN); Hailong Wang, Shenzhen (CN); Fangzhou Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/357,082

(22) Filed: Mar. 18, 2019

(65) Prior Publication Data
US 2019/0215299 A1    Jul. 11, 2019

Related U.S. Application Data

(63) Continuation of application No. PCT/CN2017/117904, filed on Dec. 22, 2017.

(30) Foreign Application Priority Data

Jan. 11, 2017  (CN) .......................... 2017 1 0021111

(51) Int. Cl.
*H04L 29/12* (2006.01)
*H04L 12/743* (2013.01)
*H04L 29/06* (2006.01)

(52) U.S. Cl.
CPC ...... *H04L 61/2546* (2013.01); *H04L 45/7453* (2013.01); *H04L 61/1511* (2013.01);
(Continued)

(58) Field of Classification Search
CPC ............... H04L 45/7453; H04L 61/103; H04L 61/1511; H04L 61/2521; H04L 61/2546;
(Continued)

(56) References Cited

U.S. PATENT DOCUMENTS 9,621,670 B2 * 4/2017 Roskind .............. H04L 61/6009
10,165,078 B1 * 12/2018 Roskind .............. G06F 16/9574
(Continued)

FOREIGN PATENT DOCUMENTS

CN    101102336 A    1/2008
CN    102075432 A    5/2011
(Continued)

OTHER PUBLICATIONS

Tencent Technology, ISR, PCT/CN2017/117904, Mar. 21, 2018, 2 pgs.
(Continued)

*Primary Examiner* — Jerry B Dennison
(74) *Attorney, Agent, or Firm* — Morgan, Lewis & Bockius LLP

(57) ABSTRACT

A domain name resolution method includes: obtaining a domain name resolution request packet; caching the obtained domain name resolution request packet to a first cache area; modifying, in the first cache area, header data included in the cached domain name resolution request packet, to obtain header data of a domain name resolution reply packet corresponding to the cached domain name resolution request packet; extracting a requested record type and a domain name to be resolved in the cached domain name resolution request packet; searching a second cache area for pre-cached reply data that corresponds to the extracted domain name and that belongs to the extracted record type; and combining the pre-cached reply data with the domain name resolution request packet obtained through modification, to obtain a domain name resolution reply packet.

18 Claims, 7 Drawing Sheets

(52) U.S. Cl.
CPC ...... *H04L 61/2521* (2013.01); *H04L 61/6009* (2013.01); *H04L 69/22* (2013.01); *H04L 61/103* (2013.01); *H04L 61/6022* (2013.01)

(58) Field of Classification Search
CPC .. H04L 61/6009; H04L 61/6022; H04L 69/22
See application file for complete search history.

(56) References Cited

U.S. PATENT DOCUMENTS

| | | | | |
|---|---|---|---|---|
| 10,375,016 | B1* | 8/2019 | Vavrusa | H04L 61/1552 |
| 2004/0073707 | A1* | 4/2004 | Dillon | H04L 29/12066 |
| | | | | 709/245 |
| 2006/0165051 | A1* | 7/2006 | Banerjee | H04L 29/12066 |
| | | | | 370/351 |
| 2009/0300191 | A1* | 12/2009 | Pace | H04L 29/12594 |
| | | | | 709/228 |
| 2009/3600191 | | 12/2009 | Pace et al. | |
| 2010/0057936 | A1* | 3/2010 | Roskind | H04L 67/02 |
| | | | | 709/245 |
| 2011/0131342 | A1* | 6/2011 | Pace | H04L 61/3065 |
| | | | | 709/245 |
| 2013/0208728 | A1* | 8/2013 | Armstrong | H04L 45/44 |
| | | | | 370/401 |
| 2015/0244670 | A1* | 8/2015 | Dong | H04L 61/1511 |
| | | | | 709/245 |
| 2016/0350157 | A1* | 12/2016 | Necas | G06F 9/505 |
| 2019/0215299 | A1* | 7/2019 | Jiang | H04L 69/22 |
| 2019/0245875 | A1* | 8/2019 | Chen | H04L 29/06 |

FOREIGN PATENT DOCUMENTS

| | | |
|---|---|---|
| CN | 104917851 A | 9/2015 |
| CN | 105681483 A | 6/2016 |
| CN | 106790762 A | 5/2017 |
| KR | 20080113023 A | 12/2008 |
| KR | 20150146422 A | 12/2014 |

OTHER PUBLICATIONS

Tencent Technology, Written Opinion, PCT/CN2017/117904, dated Mar. 21, 2018, 4 pgs.
Tencent Technology, IPRP, PCT/CN2017/117904, Jul. 16, 2019, 4 pgs.

* cited by examiner

US 10,826,869 B2

DOMAIN NAME RESOLUTION METHOD, SERVER AND STORAGE MEDIUM

CROSS-REFERENCE TO RELATED APPLICATIONS

This application is a continuation application of PCT/CN2017/117904, entitled "DOMAIN NAME RESOLUTION METHOD, SERVER AND STORAGE MEDIUM" filed on Dec. 22, 2017, which claims priority to Chinese Patent Application No. 201710021111.4, entitled "DOMAIN NAME RESOLUTION METHOD, SERVER AND APPARATUS" filed with the Chinese Patent Office on Jan. 11, 2017, all of which are incorporated by reference in their entirety.

FIELD OF THE TECHNOLOGY

This application relates to the field of computer technologies, and in particular, to a domain name resolution method, a server, and a storage medium.

BACKGROUND OF THE DISCLOSURE

With development of computer technologies, using computers to obtain information from the Internet is becoming prevalent. When obtaining information from the Internet, a user needs an Internet Protocol address (IP address), but it is quite inconveniently to use the IP address directly. In a conventional technology, a mapping relationship between a domain name and an IP address is established. After a domain name that a user requests to resolve is obtained, an IP address having a mapping relationship with the domain name is obtained through resolution based on the obtained domain name, and then the Internet is accessed based on the IP address.

However, in the conventional domain name resolution manner, after a domain name resolution request packet is obtained, resolution is performed based on each layer of data protocol of the domain name resolution request packet until an IP address corresponding to a domain name to be resolved is obtained through resolution. A plurality of data replications is required in an entire resolution process, leading to low domain name resolution efficiency.

SUMMARY

According to various embodiments of this application, a domain name resolution method, a server, and a storage medium are provided.

A first aspect of the present disclosure provides a domain name resolution method performed at a server having one or more processors and memory storing a plurality of programs to be executed by the one or more processors, the method comprising:

obtaining, by the server, a domain name resolution request packet;

caching, by the server, the obtained domain name resolution request packet to a first cache area;

modifying, by the server in the first cache area, header data in the cached domain name resolution request packet, to obtain header data of a domain name resolution reply packet corresponding to the cached domain name resolution request packet;

extracting, by the server, a requested record type and a domain name to be resolved in the cached domain name resolution request packet;

searching, by the server, a second cache area for pre-cached reply data that corresponds to the extracted domain name and that belongs to the extracted record type; and combining, by the server, the pre-cached reply data with the domain name resolution request packet obtained through modification, to obtain the domain name resolution reply packet.

A second aspect of the present disclosure provides a server having one or more processors, memory coupled to the one or more processors, and a plurality of computer-readable instructions that, when executed by the one or more processors, cause the server to perform the aforementioned domain name resolution method.

A third aspect of the present disclosure provides a non-transitory computer readable storage medium storing a plurality of instructions in connection with a server having one or more processors. The plurality of instructions, when executed by the one or more processors, cause the server to perform the aforementioned domain name resolution method.

Details of one or more embodiments of this application are provided in the following accompanying drawings and descriptions. Other features, objectives, and advantages of this application become more obvious with reference to the specification, the accompanying drawings, and the claims.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

To make the objectives, technical solutions, and advantages of this application clearer and more comprehensible, the following further describes this application in detail with reference to the accompanying drawings and embodiments. It should be understood that the specific embodiments described herein are merely used to explain this application but are not intended to limit this application.

Figure 1:
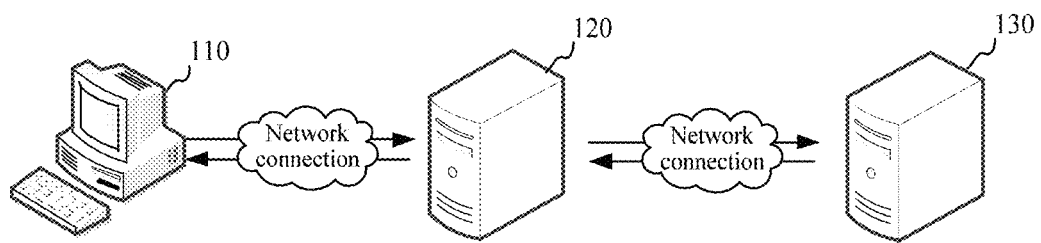
FIG. 1 is a diagram of an application environment of a domain name resolution method according to an embodiment.

FIG. 1 is a diagram of an application environment of a domain name resolution method according to an embodiment. Referring to FIG. 1, the domain name resolution method is applied to a domain name resolution system. The domain name resolution system includes a terminal 110, a domain name resolution server 120, and an authorized domain name server 130. The terminal 110 is connected to the domain name resolution server 120 by using a network, and the domain name resolution server 120 is connected to the authorized domain name server 130 by using a network. The terminal 110 may be specifically a desktop terminal or a mobile terminal. The mobile terminal may be specifically at least one of a mobile phone, a tablet computer, a notebook computer, a smartwatch, a personal digital assistant (PDA), a networkable e-reader, and the like. The domain name resolution server 120 and the authorized domain name server 130 may be specifically independent physical servers or physical server clusters.

Figure 2:
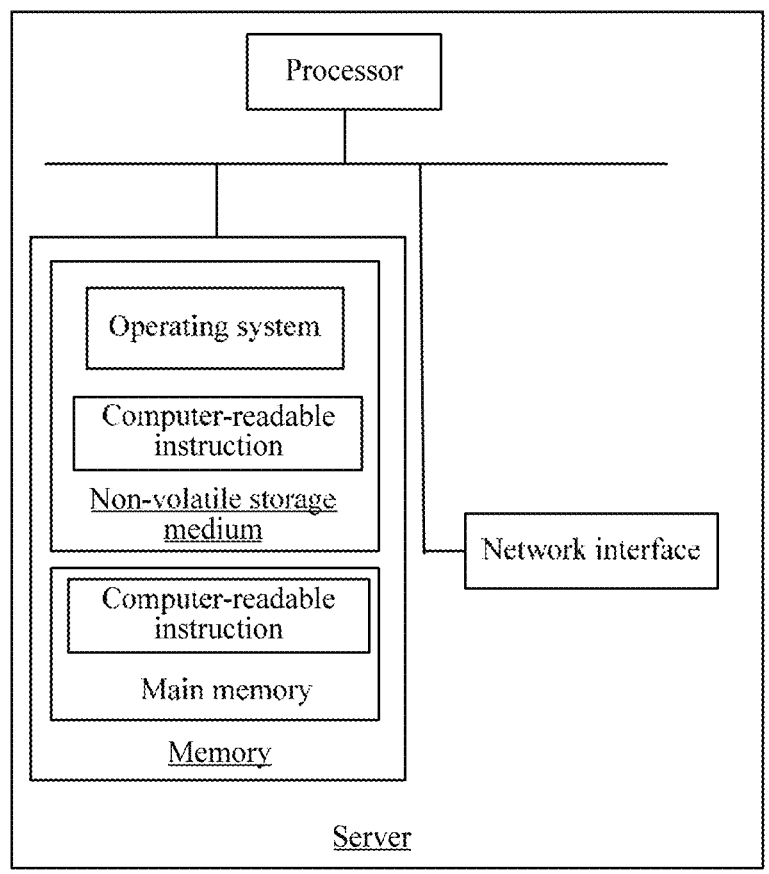
FIG. 2 is a schematic diagram of an internal structure of a server configured to implement a domain name resolution method according to an embodiment.

As shown in FIG. 2, in an embodiment, a server is provided. The server may be used as the domain name resolution server 120 in FIG. 1 to implement a domain name resolution method. Referring to FIG. 2, the server includes a processor, a memory, and a network interface that are connected by using a system bus. The memory includes a non-volatile storage medium and a main memory. The non-volatile storage medium of the server may store an operating system and computer-readable instructions. The computer-readable instructions, when executed, may cause the processor to perform a domain name resolution method. The processor of the server is configured to provide computing and control capabilities to support running of the entire server. The memory of the server may store computer-readable instructions. The computer-readable instructions, when executed by the processor, may cause the processor to perform a domain name resolution method. The network interface of the server is configured to communicate with an external terminal by using a network connection, for example, receive a domain name resolution request packet sent by the terminal and return a domain name resolution reply packet to the terminal. The server may be implemented by an independent server or implemented by a server cluster including a plurality of servers. A person skilled in the art may understand that, in the structure shown in FIG. 2, only a block diagram of a partial structure related to a solution in this application is shown, and does not constitute a limit to the server to which the solution in this application is applied. Specifically, the server may include more or fewer components than those shown in the figure, or some components may be combined, or a different component deployment may be used.

Figure 3:
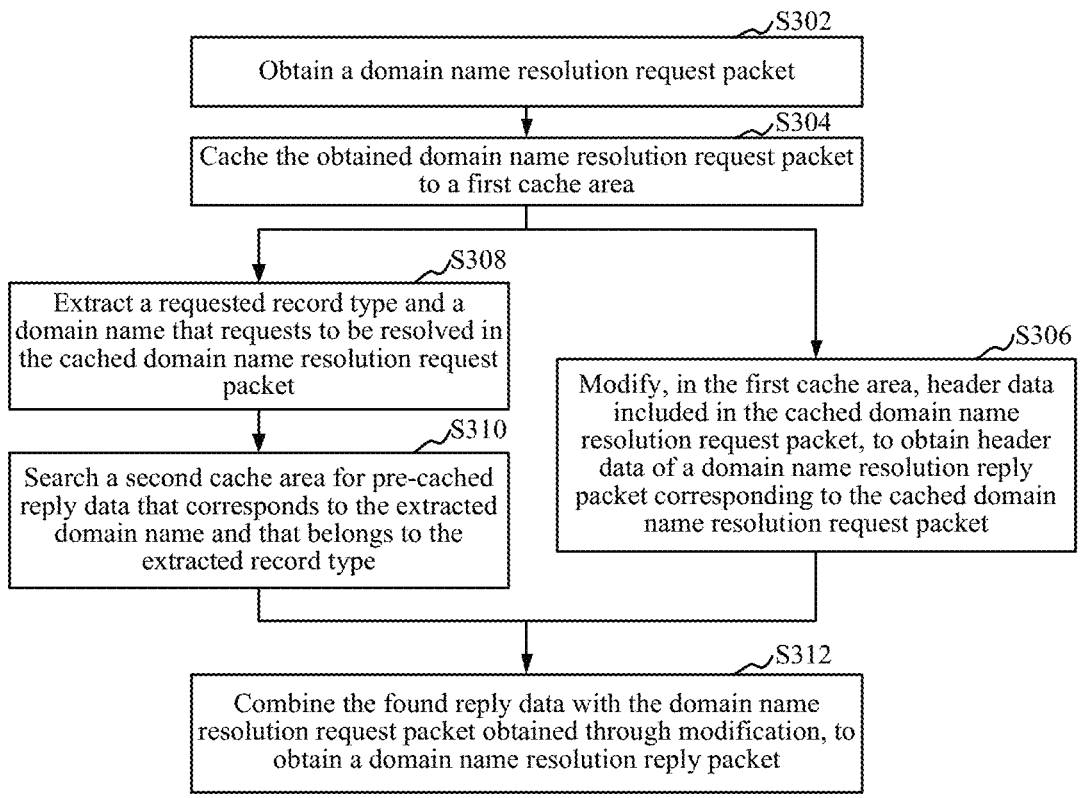
FIG. 3 is a schematic flowchart of a domain name resolution method according to an embodiment.

As shown in FIG. 3, in an embodiment, a domain name resolution method is provided. This embodiment is described by using an example in which the method is applied to the domain name resolution server 120 in FIG. 1. The method specifically includes the following steps:

S302. Obtain a domain name resolution request packet.

The domain name resolution request packet is a data packet that is used for requesting to perform domain name resolution. A domain name is a name that is of a computer or a computer group on the Internet and that includes a character string separated by points, and is used for identifying an electronic bearing of a computer during data transmission. The domain name resolution is a process of resolving a domain name into a record type to which the domain name resolution request packet points. The record type is, for example, an address-pointing record type, a mail exchanger record type, or an alias record type.

Specifically, when obtaining a domain name entered by a user and obtaining a request for accessing the Internet by using the domain name, a terminal may first determine a record type to which the request points, and search a local database or cache for a record that corresponds to the obtained domain name and that belongs to the record type to which the request points. If a record is found, the terminal accesses the Internet based on the record. If no record is found, the terminal encapsulates, based on a domain name resolution request packet format, the obtained domain name and the record type to which the request points, to generate a domain name resolution request packet, and sends the domain name resolution request packet to the domain name resolution server. The domain name resolution server receives the domain name resolution request packet sent by the terminal, to obtain the domain name resolution request packet.

S304. Cache the obtained domain name resolution request packet to a first cache area.

The first cache area is a cache area obtained by dividing a cache in the domain name resolution server, and is used for storing the obtained domain name resolution request packet. Specifically, the domain name resolution server receives a data packet by using a network adapter, and after receiving the domain name resolution request packet, may cache the received domain name resolution request packet to the first cache area through a process.

In an embodiment, the domain name resolution server may start a network adapter driving process in kernel space by using an operating system kernel to obtain a domain name resolution request packet received by the network adapter, and store the obtained domain name resolution request packet in a first cache area of the kernel space, to wait for a response from the operating system kernel.

In an embodiment, the domain name resolution server may alternatively pre-configure a data packet intercepting process running in kernel space. After a network adapter driving process obtains a domain name resolution request packet received by the network adapter, a domain name resolution process in user space of the domain name resolution server may start the data packet intercepting process, and store, in a first cache area of the user space by using the data packet intercepting process, the domain name resolution request packet obtained by the network adapter driving process, to wait for a response from the domain name resolution process in the user space.

An operating system is used for managing computer hardware and software, an area in which the operating system kernel is located is the kernel space, and a kernel function module runs in the kernel space. The user space is space that is divided by the operating system with respect to the kernel space. The network adapter is a network component operating on a link layer, and is configured to send and receive data packets. The network adapter driving process is a process invoked by the operating system kernel to obtain the data packet received by the network adapter and to send the data packet to the network adapter. The data packet intercepting process is a pre-configured process used for intercepting the data packet obtained by the network adapter driving process to the user space. For example, the domain name resolution server may pre-configure the data packet intercepting process by using a data plane development kit (DPDK). The configured data packet intercepting process can directly store and transfer the intercepted data packet to the user space without forwarding the intercepted data packet in the kernel space. The data packet intercepting process may be started by the operating system kernel, or may be started by the domain name resolution process in the user space.

S306. Modify, in the first cache area, header data included in the cached domain name resolution request packet, to obtain header data of a domain name resolution reply packet corresponding to the cached domain name resolution request packet.

A domain name resolution data packet usually includes five parts: header data, a query problem, a reply, an authorized reply, and additional information. Usually, both the domain name resolution request packet and the domain name resolution reply packet use a data packet format including the foregoing five parts. The header data is a part necessarily included in the domain name resolution data packet, and includes a domain name resolution data packet identifier, a domain name resolution data packet flag, the number of request problems, the number of resource records, the number of authorized resource records, and the number of additional resource records.

The domain name resolution data packet identifier is used for identifying the domain name resolution data packet. A corresponding domain name resolution request packet and domain name resolution reply packet have a same domain name resolution data packet identifier, and the domain name resolution data packet identifier may be used for matching the domain name resolution reply packet that corresponds to the domain name resolution request packet. The domain name resolution data packet flag defines whether the domain name resolution data packet is a request packet or a reply packet, also defines whether other parts than the header data need to exist, and defines a query type. The number of request problems, the number of resource records, the number of authorized resource records, and the number of additional resource records respectively correspond to the number of query problems, the number of replies, the number of authorized replies, and the amount of additional information.

Specifically, the domain name resolution server may first determine the header data of the domain name resolution reply packet corresponding to the cached domain name resolution request packet, and based on the determined header data of the domain name resolution reply packet, determine difference data of the header data of the domain name resolution request packet and the header data of the domain name resolution reply packet. The domain name resolution server may position the determined difference data in the first cache area, and modify the positioned difference data based on the header data of the domain name resolution reply packet.

The difference data includes the domain name resolution data packet flag and the number of resource records. For example, a character representing a request packet in a domain name resolution data packet flag included in the received domain name resolution request packet is "0", and should be modified into "1" representing a reply. The number of resource records is correspondingly modified based on the number of request problems.

S308. Extract a requested record type and a domain name to be resolved in the cached domain name resolution request packet.

Specifically, the domain name requested in the domain name resolution request packet and the requested record type are encapsulated into a query problem part of the domain name resolution request packet. The domain name resolution server may resolve the domain name resolution request packet to obtain a resolution result after obtaining the domain name resolution request packet, and extract, from the resolution result, the domain name to be resolved in the domain name resolution request packet and the requested record type.

The requested record type is, for example, an address-pointing record type, a mail exchanger record type, or an alias record type. An address-pointing record, namely, an A (Address) record, is also referred to as IP (Internet Protocol) pointing, and is a record used for specifying an IP address corresponding to a host name or a domain name. A mail exchanger record, namely, a mail exchanger (MX) record, is a record used for positioning a mail server based on an address suffix of a receiver when a mail is sent in an electronic mail system, where the address suffix of the receiver points to an IP address of the mail server. An alias record, namely a CNAME record, which is also referred to as an alias record, is a record for mapping a plurality of names or domain names to a same computer. The record includes two domain names or names, and a first domain name points to a second domain name.

S310. Search a second cache area for pre-cached reply data that corresponds to the extracted domain name and that belongs to the extracted record type.

The second cache area is a cache area obtained by dividing the cache in the domain name resolution server, and is used for storing pre-encapsulated reply data. The second cache area and the first cache area are different cache areas.

After each time of domain name resolution, the domain name resolution server may record a resolution result, and store a domain name resolution record in a database. The domain name resolution server may establish a connection to an authorized domain name server, to detect whether a locally stored domain name resolution record is consistent with a corresponding domain name resolution record stored in the authorized domain name server. If the two records are inconsistent, the corresponding domain name resolution record stored in the authorized domain name server is synchronized to the local database. The detecting operation may be performed in a preset detection period, or may be performed when a current time point exceeds a cache deadline included in the domain name resolution record.

Specifically, a format of the reply data is fixed, and the domain name resolution server may encapsulate, based on a preset reply format, the domain name resolution record stored in the database, to obtain the reply data, and cache the reply data to the second cache area, so that searching is performed based on a requirement. The domain name resolution server may classify the obtained reply data and cache the classified reply data to the second cache area based on a record type to which the reply data belongs, when domain name resolution needs to be performed, determine, based on the extracted record type, a reply data set belonging to the extracted record type, and then select, from the determined reply data set, pre-cached reply data corresponding to the extracted domain name.

The domain name resolution server may alternatively classify the obtained reply data and cache the classified reply data to the second cache area based on a domain name corresponding to the reply data, when domain name resolution needs to be performed, determine, based on the extracted domain name, a reply data set corresponding to the extracted domain name, and then select, from the determined reply data set, pre-cached reply data belonging to the extracted record type.

The domain name resolution server may alternatively obtain the number of historical records corresponding to the locally stored domain name resolution record, sort the obtained reply data in descending order of the number of historical records corresponding to a domain name resolution record corresponding to reply data, cache the obtained reply data to the second cache area, and when domain name resolution needs to be performed, search for pre-cached reply data that corresponds to the extracted domain name and that belongs to the extracted record type.

Steps S308 to S310 and step S306 may be performed asynchronously.

S312. Combine the pre-cached reply data with the domain name resolution request packet obtained through modification, to obtain a domain name resolution reply packet.

Specifically, the domain name resolution server may position the domain name resolution request packet that is obtained through modification and that is cached in the first cache area, add the found reply data to a tail of data included in the positioned domain name resolution request packet, and combine the reply data with the cached domain name resolution request packet to obtain the domain name resolution reply packet.

In the domain name resolution method, the obtained domain name resolution request packet is stored in the first cache area, the cached domain name resolution request packet is resolved in the first cache area, the header data included in the domain name resolution request packet is modified into the header data of the corresponding domain name resolution reply packet, and then the found reply data is combined with the domain name resolution request packet obtained through modification, to obtain the domain name resolution reply packet. The reply data that is searched for is prestored in the second cache area, and after the reply data is found, the reply data may be directly combined with the domain name resolution request packet obtained through modification, thereby greatly improving the domain name resolution efficiency. In addition, after the reply data is replicated from the second cache area to the first cache area, the domain name resolution process can be completed in the first cache area, thereby effectively reducing the number of data replications, and further improving the domain name resolution efficiency.

In an embodiment, step S302 specifically includes: obtaining, by the server when an operating system kernel reads a data packet from a network adapter receiving queue and transfers the data packet to the user space, a data protocol identifier included in the transferred data packet; and obtaining, when the data protocol identifier indicates that the transferred data packet is a domain name resolution request packet, the domain name resolution request packet. In this embodiment, the first cache area and the second cache area are in the user space.

The data protocol identifier is an identifier of each layer of data protocol included in a data packet. When a data packet is generated and passes a data link layer, a network layer, a transport layer, and the like, a data protocol identifier of a corresponding data protocol layer is added to the data packet. Identifiers of various layers of data protocols included in different types of data packets are different. For example, a data protocol identifier of a data packet in the network layer is Transmission Control Protocol (TCP)/User Datagram Protocol (UDP), and a data packet whose destination port in the transport layer is port 53 is a domain name resolution data packet.

Specifically, the operating system kernel of the domain name resolution server may start the pre-configured data packet intercepting process, read the data packet from the network adapter receiving queue, and transfer the read data packet to the user space. The domain name resolution process in the user space obtains the data protocol identifier included in the transferred data packet, and detects the obtained data protocol identifier based on an identifier of each layer of data protocol matching the domain name resolution request packet. When the obtained data protocol identifier is consistent with the identifier of each layer of data protocol matching the domain name resolution request packet, it indicates that the transferred data packet is a domain name resolution request packet, and the domain name resolution process in the user space obtains the domain name resolution request packet.

Further, when the obtained data protocol identifier is inconsistent with the identifier of each layer of data protocol matching the domain name resolution request packet, it indicates that the transferred data packet is a non-domain-name-resolution request packet, and the domain name resolution process in the user space returns the transferred data packet to the operating system kernel for responding.

In this embodiment, domain name resolution is directly performed, in the user space, on a data packet that is determined as a domain name resolution request packet without using the kernel space, thereby avoiding a plurality of data replications required during resolution in the kernel space, and improving the domain name resolution efficiency. In addition, a data packet that is determined as a non-domain-name-resolution request packet is fed back to the operating system kernel for responding, thereby providing a manner of processing a data packet that cannot be resolved in the user space, and improving a success rate of data packet resolution.

In an embodiment, the domain name resolution method further includes: selecting a resolution thread in idle mode from parallel resolution threads, and then performing step S302 to step S312 by using the selected resolution thread.

The resolution thread is a thread used for performing domain name resolution. The idle mode means that domain name resolution is not performed in a current time period. Specifically, a plurality of parallel resolution threads is run in the domain name resolution process of the domain name resolution server, and the resolution threads are independent from each other. The domain name resolution process of the domain name resolution server may start the network adapter driving process to obtain the domain name resolution request packet received by the network adapter, and then select the resolution thread in idle mode to perform the domain name resolution process on the obtained domain name resolution request packet.

In this embodiment, the domain name resolution process is independently performed by a resolution thread, without involving data exchange processing performed with other threads, thereby avoiding a waiting process for data exchange processing between threads, and further improving the domain name resolution efficiency.

Figure 4:
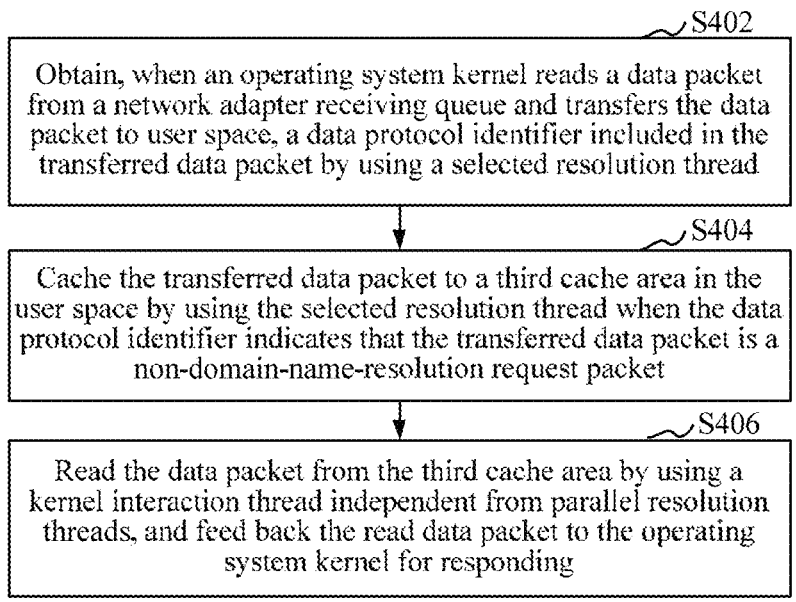
FIG. 4 is a schematic flowchart of a step of obtaining a domain name resolution request packet by using a selected resolution thread according to an embodiment.

As shown in FIG. 4, in an embodiment, the first cache area and the second cache area used in the domain name resolution method are in the user space. In the domain name resolution method, the obtaining a domain name resolution request packet by using the selected resolution thread includes:

S402. Obtain, by using the selected resolution thread when an operating system kernel reads a data packet from a network adapter receiving queue and transfers the data packet to the user space, a data protocol identifier included in the transferred data packet.

Specifically, the operating system kernel of the domain name resolution server may start the pre-configured data packet intercepting process, read the data packet from the network adapter receiving queue, and transfer the read data packet to the user space. Then, the domain name resolution server obtains the data protocol identifier included in the transferred data packet by using a resolution thread in the user space.

S404. Cache the transferred data packet to a third cache area in the user space by using the selected resolution thread when the data protocol identifier indicates that the transferred data packet is a non-domain-name-resolution request packet.

Specifically, the domain name resolution server compares, by using the resolution thread in the user space, the obtained data protocol identifier with the identifier of each layer of data protocol matching the domain name resolution request packet, and when a comparison result indicates that the obtained data protocol identifier is inconsistent with the identifier of each layer of data protocol matching the domain name resolution request packet, determines that the transferred data packet is a non-domain-name-resolution request packet. The domain name resolution process in the user space caches the transferred data packet to the third cache area in the user space. The third cache area is a cache area obtained by dividing the cache in the domain name resolution server, and is used for storing the non-domain-name-resolution request packet transferred to the user space.

S406. Read the data packet from the third cache area by using a kernel interaction thread independent from the parallel resolution threads, and return the read data packet to the operating system kernel for responding.

The kernel interaction thread is a thread that exists independent from the resolution thread and that interacts with the kernel space. Specifically, the resolution thread in the user space cannot directly interact with the operating system kernel. Therefore, the non-domain-name-resolution request packet that needs to be fed back to the operating system kernel for responding is cached to the third cache area in the user space. Then, the kernel interaction thread that can interact with the operating system kernel and that is independent from the parallel resolution threads reads the data packet from the third cache area, and caches the read data packet to a cache area in the kernel space. The resolution thread in the kernel space resolves the data packet cached in the cache area in the kernel space, and obtains a reply packet corresponding to the resolution packet.

In this embodiment, the non-domain-name-resolution request packet that cannot be resolved by the domain name resolution process in the user space is fed back to the operating system kernel for responding, thereby avoiding a failure in resolving the non-domain-name-resolution request packet by the domain name resolution process in the user space, and improving a success rate of data packet resolution.

In an embodiment, the domain name resolution method may further include: obtaining a data packet and caching the data packet to the first cache area; detecting, in the first cache area, a data protocol identifier included in the data packet; and when the data protocol identifier indicates that a transferred data packet is a domain name resolution request packet, continuing to perform step S306 to step S310; or when the data protocol identifier indicates that a transferred data packet is a non-domain-name-resolution request packet, returning the cached data packet to the operating system kernel for responding.

Specifically, in the domain name resolution method, after the operating system kernel reads the data packet from the network adapter receiving queue and transfers the data packet to the user space, the read data packet can be directly cached to the first cache area in the user space. The resolution thread in idle mode is selected from the parallel resolution threads in the user space, and whether the data packet cached to the first cache area is a domain name resolution request packet is detected. When it is determined, through detection, that the cached data packet is a domain name resolution request packet, step S306 to step S310 continue to be performed by using the selected resolution thread. When it is determined, through detection, that the cached data packet is a non-domain-name-resolution request packet, an address pointer of the non-domain-name-resolution request packet in the first cache area is cached to the third cache area by using the selected resolution thread. Next, the kernel interaction thread independent from the parallel resolution threads reads the non-domain-name-resolution request packet from the first cache area based on the address pointer stored in the third cache area, and stores the non-domain-name-resolution request packet to the cache area in the kernel space. Then, the operating system kernel responds to the non-domain-name-resolution request packet stored in the cache area in the kernel space.

A pointer is a variant used for indicating a computer language of a main memory address. The address pointer of the non-domain-name-resolution request packet in the second cache area points to a cache address of the non-domain-name-resolution request packet in the second cache area. The non-domain-name-resolution request packet is, for example, an Address Resolution Protocol (ARP) request packet or an Open Shortest Path First (OSPF) request packet.

In this embodiment, the data packet is directly cached to the first cache area. A domain name resolution operation is directly performed when it is determined, through detection, that the data packet is a domain name resolution request packet. Alternatively, after it is determined, through detection, that the data packet is a non-domain-name-resolution request packet, the non-domain-name-resolution request packet in the first cache area is fed back to the operating system kernel for responding. This further reduces the number of data replications, provides a manner of processing a data packet that cannot be resolved in the user space, and improves a success rate of data packet resolution.

Figure 5:
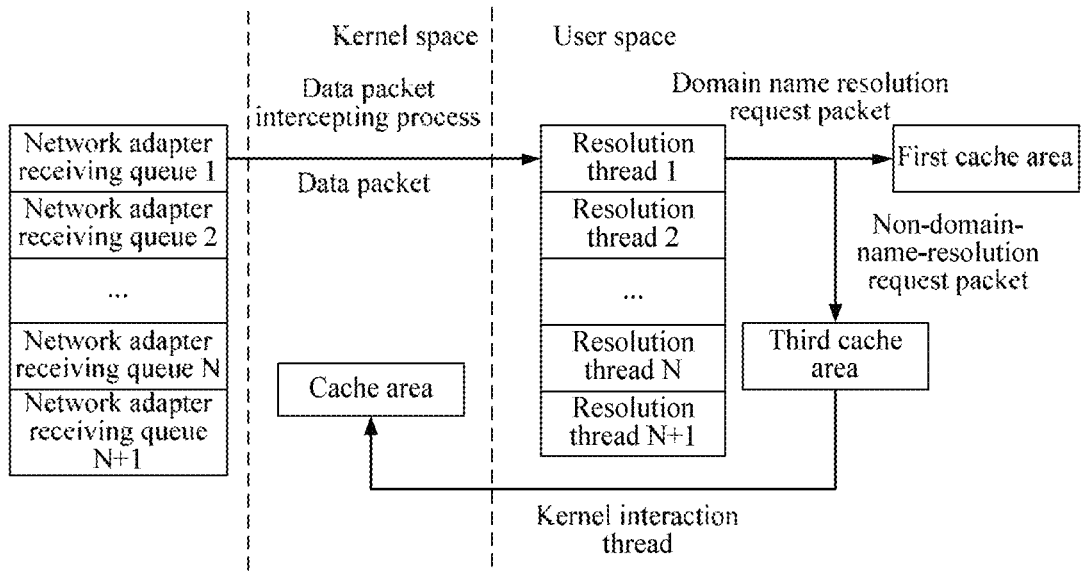
FIG. 5 is an internal architectural diagram of a domain name resolution server according to an embodiment.

FIG. 5 is an internal architectural diagram of a domain name resolution server according to an embodiment. Referring to FIG. 5, system space of the domain name resolution server is divided into kernel space and user space. An operating system kernel may start a data packet intercepting process to read a data packet from a network adapter receiving queue and transfer the data packet to the user space. After determining that the transferred data packet is a domain name resolution data packet, a resolution thread in the user space caches the transferred domain name resolution data packet to a first cache area; or after determining that the transferred data packet is a non-domain-name-resolution data packet, caches the transferred non-domain-name-resolution data packet to a third cache area. A kernel interaction thread that is in the user space and that is independent from the resolution thread caches, to a cache area in the kernel space, the non-domain-name-resolution data packet that is cached in the third cache area, so that the operating system kernel performs responding.

Figure 6:
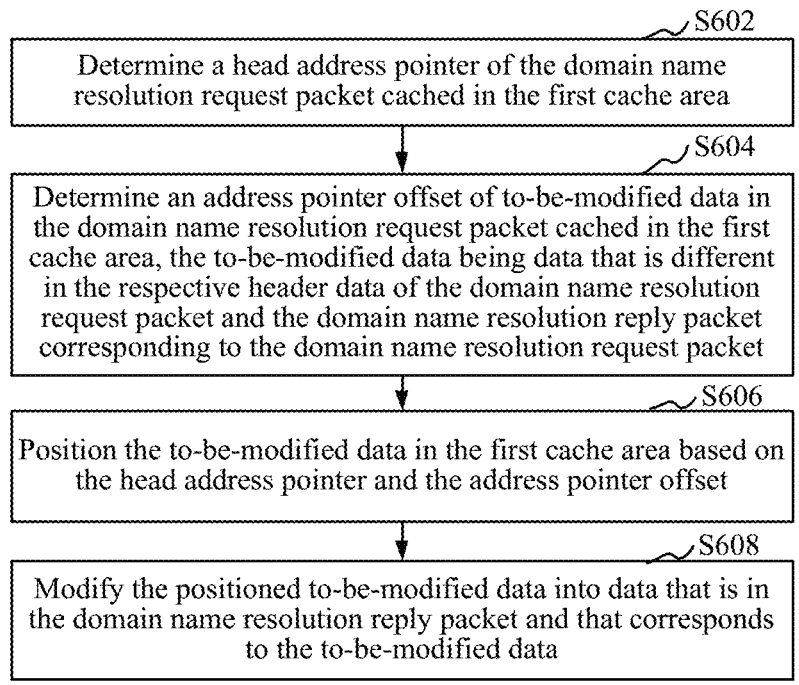
FIG. 6 is a schematic flowchart of a step of modifying, in a first cache area, header data included in a cached domain name resolution request packet, to obtain header data of a domain name resolution reply packet corresponding to the cached domain name resolution request packet according to an embodiment.

As shown in FIG. 6, in an embodiment, step S306 specifically includes the following steps:

S602. Determine a head address pointer of the domain name resolution request packet cached in the first cache area.

Specifically, after caching the obtained domain name resolution request packet to the first cache area, the domain name resolution server may store the head address pointer of the domain name resolution request packet to a temporary cache file or a log file, and read the head address pointer when needing to modify data in the domain name resolution request packet.

S604. Determine an address pointer offset of to-be-modified data in the domain name resolution request packet cached in the first cache area, the to-be-modified data being data that is different in the respective header data of the domain name resolution request packet and the domain name resolution reply packet corresponding to the domain name resolution request packet.

Specifically, the domain name resolution server may first determine the header data of the domain name resolution reply packet corresponding to the cached domain name resolution request packet; based on the determined header data of the domain name resolution reply packet, determine difference data of the header data of the domain name resolution request packet and the header data of the domain name resolution reply packet; and use the determined difference data as the to-be-modified data.

Usually, division based on the determined bytes is performed on data encapsulated in header data of a domain name resolution data packet. For example, the first byte and the second byte in the header data of the domain name resolution data packet are a domain name resolution data packet identifier, and the third byte and the fourth byte are a domain name resolution data packet flag. The first bit in a character field of the domain name resolution data packet flag is a flat bit, "0" representing the domain name resolution request packet, "1" representing the domain name resolution reply packet, and the like. The domain name resolution server may determine the address pointer offset of the to-be-modified data based on a byte of the determined difference data.

S606. Position the to-be-modified data in the first cache area based on the head address pointer and the address pointer offset.

Specifically, an address pointer of the to-be-modified data may be obtained by adding the address pointer offset of the to-be-modified data to the head address pointer of the domain name resolution request packet, and the domain name resolution server may determine a cache address of the to-be-modified data in the first cache area based on the obtained address pointer.

S608. Modify the positioned to-be-modified data into data that is in the domain name resolution reply packet and that corresponds to the to-be-modified data.

Specifically, the domain name resolution server writes, in the determined cache address of the to-be-modified data in the first cache area, the header data of the domain name resolution reply packet corresponding to the domain name resolution request packet. For example, a flag bit representing a data packet type is changed from a flag representing a request packet to a flat representing a reply packet.

In this embodiment, in the first cache area in which the domain name resolution request packet is cached, the header data of the domain name resolution request packet is directly modified into the header data of the domain name resolution reply packet corresponding to the domain name resolution request packet, thereby avoiding real-time encapsulation of the domain name resolution reply packet in a resolution process, reducing a reply time, and further improving the domain name resolution efficiency.

Figure 7:
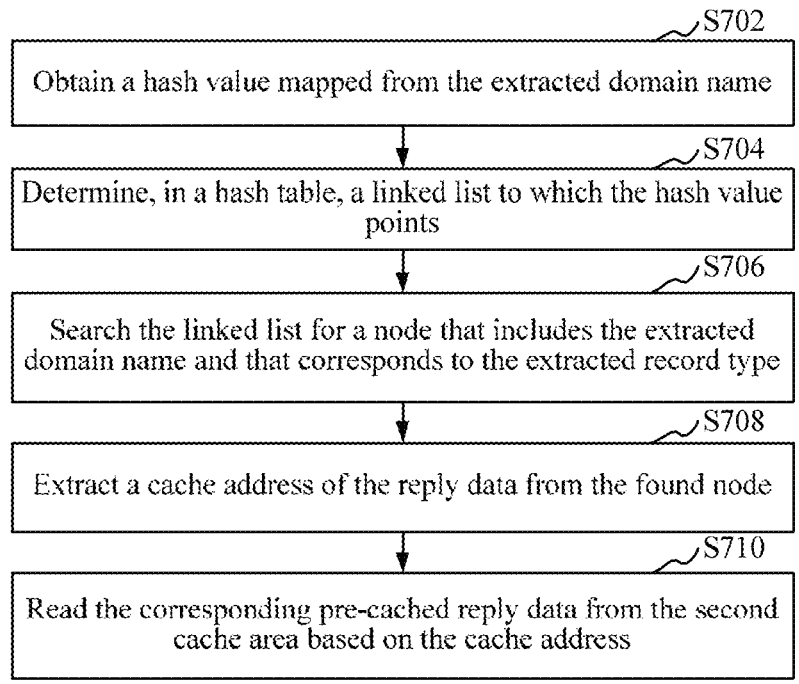
FIG. 7 is a schematic flowchart of a step of searching a second cache area for pre-cached reply data that corresponds to an extracted domain name and that belongs to an extracted record type according to an embodiment.

As shown in FIG. 7, in an embodiment, step S310 specifically includes the following steps:

S702. Obtain a hash value corresponding to the extracted domain name.

The hash value is a smaller binary value that has a fixed length and that is obtained by mapping a binary value having any length through a hash algorithm. For example, the hash algorithm is accumulatively adding American Standard Code for Information Interchange codes (ASCII code) corresponding to all characters in a character string. In this case, a hash value corresponding to a character string "ming" is 109+105+110+103=427. Specifically, the domain name resolution server may calculate, based on a preset hash algorithm, a hash value corresponding to the extracted domain name.

S704. Determine, in a hash table, a linked list corresponding to the hash value.

The hash table is a table used for storing, based on a mapping relationship between a domain name and a hash value, domain names and cache addresses of reply data corresponding to the domain names. The hash value is a storage location of a domain name in the hash table. A domain name and reply data corresponding to the domain name are stored at a storage location of a hash value mapped from the domain name. The linked list is a linked storage structure used for storing a plurality of data elements. In this embodiment, the linked list is a sub-list that stores domain names mapping to a same hash value and to which the same hash value points.

Specifically, the domain name resolution server may pre-establish a plurality of hash tables based on the record type requested in the domain name resolution request packet, and each hash table correspondingly stores cache addresses of reply data belonging to a same record type and corresponding domain names. The linked list corresponding to the hash value is determined in a hash table corresponding to the extracted request type. Alternatively, the domain name resolution server may store, in one hash table, a cache address of reply data, a corresponding domain name, and a record type to which the reply data belongs, and determine, in the hash table, the linked list corresponding to the hash value.

S706. Search the linked list for a node that includes the extracted domain name and that corresponds to the extracted record type.

Each element stored in the linked list is referred to as a node. Each node includes two parts: a data field storing a data element and a pointer field storing an address of a next node.

Specifically, the domain name resolution server may compare, in the determined linked list, the extracted domain name with each domain name stored in a data field of each node, and when a domain name stored in a node is consistent with the extracted domain name, determine that the node is a node needing to be searched for. The linked list used for searching belongs to a hash table corresponding to the extracted request type.

When the domain name resolution server stores, in one hash table, a cache address of reply data, a corresponding domain name, and a record type to which the reply data belongs, after successfully comparing, in the determined linked list, the extracted domain name with a domain name stored in a data field of each node, the domain name resolution server compares, in the determined linked list, the extracted record type with a record type stored in a data field of each node, and when a record type stored in a node is consistent with the extracted record type, determines that the node is a node needing to be searched for.

S708. Extract a cache address of the reply data from the found node.

S710. Read the corresponding pre-cached reply data from the second cache area based on the cache address.

Specifically, the domain name resolution server may read cached data from a cache address in the second cache area, and the read cached data is the pre-cached reply data.

In this embodiment, the hash table is searched for the cache address of the reply data, and then the reply data is read from a cache based on the found address, thereby avoiding a waste of time caused by directly searching each cache for the corresponding reply data, greatly improving a searching rate, and further improving the domain name resolution efficiency.

Further, when the domain name resolution server does not find corresponding reply data in the hash table, the domain name resolution server determines a primary domain name corresponding to the extracted domain name, and searches the hash table for reply data that corresponds to the determined primary domain name and that belongs to a domain name starting record type. A domain name uses a hierarchical structure that is layered according to a geographical domain or an institutional domain. Layers are separated by using decimal points, and are a top-level domain name field, a second-level domain name field, and the like from right to left. The leftmost field is the primary domain name. For example, a requested domain name is www.xx.com, and a primary domain name of the requested domain name is xx.com. The domain name starting record indicates an authorized domain name server corresponding to the primary domain name.

In this embodiment, a processing method is provided, the method being used when no reply data corresponding to the requested record type and the domain name to be resolved in the domain name resolution request packet is found, to return a domain name starting record, so that a domain name resolution requesting party may send a domain name resolution request to the authorized domain name server based on the domain name starting record, thereby improving a success rate of domain name resolution.

Figure 8:
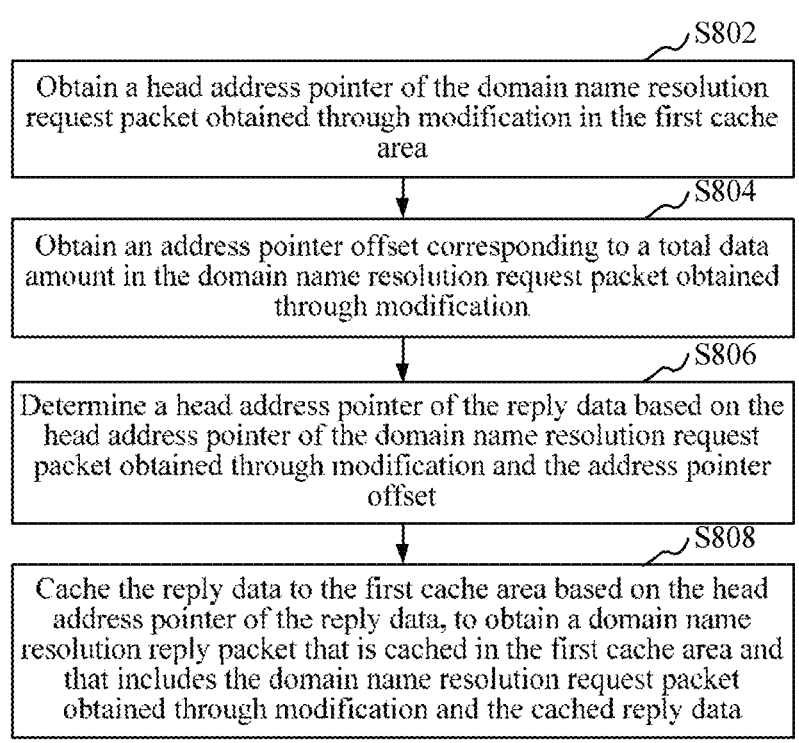
FIG. 8 is a schematic flowchart of a step of combining a found reply data with a domain name resolution request packet obtained through modification, to obtain a domain name resolution reply packet according to an embodiment.

As shown in FIG. 8, in an embodiment, step S312 specifically includes the following steps:

S802. Obtain a head address pointer of the domain name resolution request packet that is obtained through modification and that is in the first cache area.

Specifically, after caching the obtained domain name resolution request packet to the first cache area, the domain name resolution server may store the head address pointer of the domain name resolution request packet to a temporary cache file or a log file, and read the head address pointer when needing to modify data in the domain name resolution request packet. After the domain name resolution request packet is modified, the head address pointer remains unchanged.

S804. Obtain an address pointer offset corresponding to a total data amount in the domain name resolution request packet obtained through modification.

Specifically, the domain name resolution server may detect the total data amount in the domain name resolution request packet obtained through modification, determine, based on the detected total data amount, a cache address interval occupied in the first cache area by the domain name resolution request packet obtained through modification, and determine the address pointer offset based on a size of the address interval.

S806. Determine a head address pointer of the reply data based on the head address pointer of the domain name resolution request packet obtained through modification and the address pointer offset.

Specifically, the domain name resolution server may add the address pointer offset to the head address pointer of the domain name resolution request packet obtained through modification, to obtain the head address pointer of the reply data.

S808. Cache the reply data to the first cache area based on the head address pointer of the reply data, to obtain a domain name resolution reply packet that is cached in the first cache area and that includes the domain name resolution request packet obtained through modification and the cached reply data.

Specifically, the determined head address pointer of the reply data is a next cache address of a cache address of the last byte of data included in the domain name resolution request packet obtained through modification. The reply data is cached to the first cache area based on the determined head address pointer, to obtain the domain name resolution reply packet that is cached in the first cache area and that includes the domain name resolution request packet obtained through modification and the cached reply data.

In this embodiment, in the domain name resolution process, both the domain name resolution request packet and the domain name resolution reply packet are obtained in the first cache area. Provided that the reply data found in the second cache area is replicated to a tail of data included in the domain name resolution request packet in the first cache area, the reply data can be combined with the domain name resolution request packet to obtain the domain name resolution reply packet, thereby improving the domain name resolution efficiency.

Figure 9:
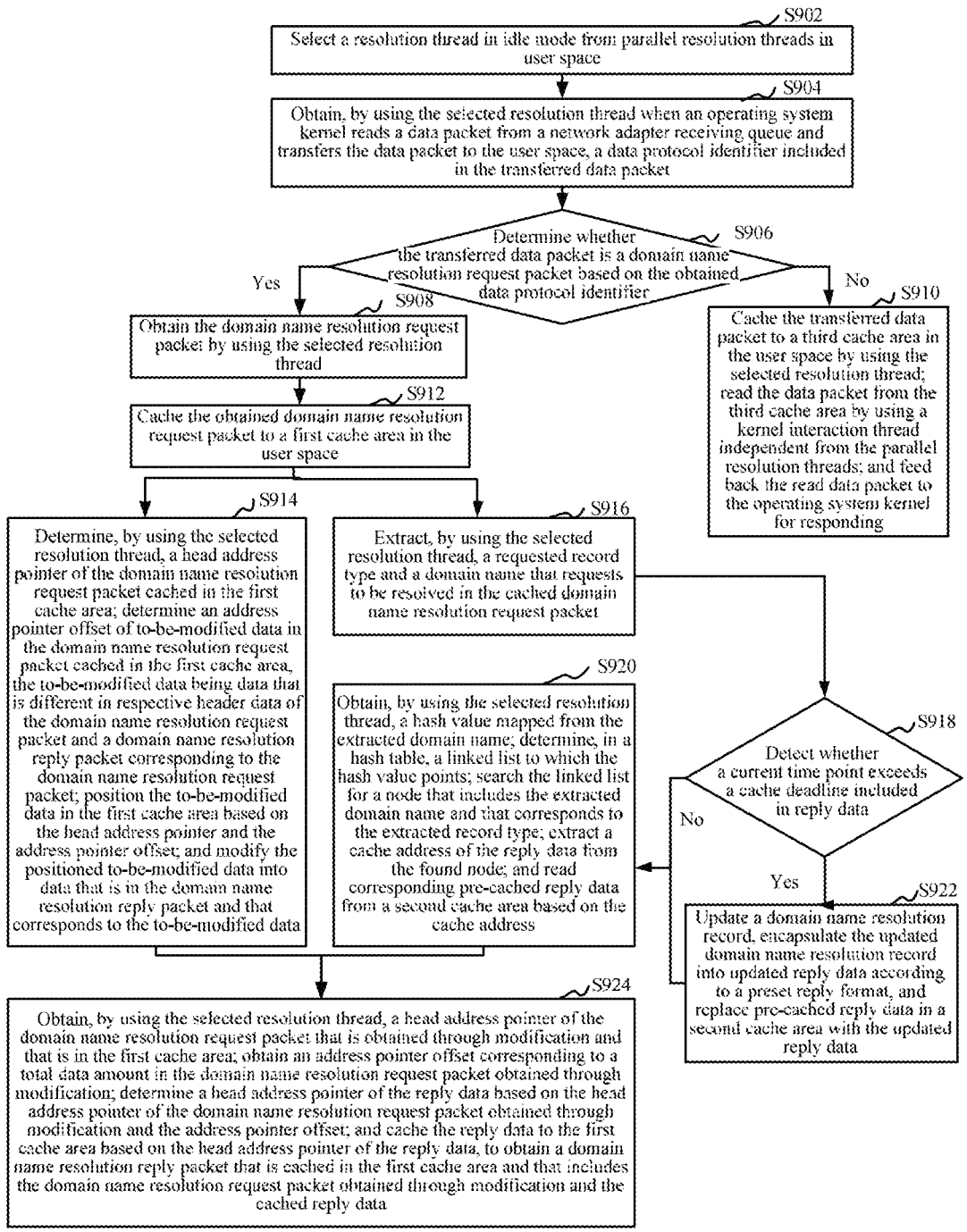
FIG. 9 is a schematic flowchart of a domain name resolution method according to another embodiment.

As shown in FIG. 9, in an embodiment, a domain name resolution method is provided. The method specifically includes the following steps:

S902. Select a resolution thread in idle mode from parallel resolution threads in user space.

S904. Obtain, by using the selected resolution thread when an operating system kernel reads a data packet from a network adapter receiving queue and transfers the data packet to the user space, a data protocol identifier included in the transferred data packet.

S906. Determine whether the transferred data packet is a domain name resolution request packet based on the obtained data protocol identifier; and if yes, proceed to step S908; or if no, proceed to step S910.

S908. Obtain the domain name resolution request packet by using the selected resolution thread, and proceed to step S912.

S910. Cache the transferred data packet to a third cache area in the user space by using the selected resolution thread; read the data packet from the third cache area by using a kernel interaction thread independent from the parallel resolution threads; and return the read data packet to the operating system kernel for responding.

S912. Cache the obtained domain name resolution request packet to a first cache area in the user space.

S914. Determine, by using the selected resolution thread, a head address pointer of the domain name resolution request packet cached in the first cache area; determine an address pointer offset of to-be-modified data in the domain name resolution request packet cached in the first cache area, the to-be-modified data being data that is different in respective header data of the domain name resolution request packet and a domain name resolution reply packet corresponding to the domain name resolution request packet; position the to-be-modified data in the first cache area based on the head address pointer and the address pointer offset; and modify the positioned to-be-modified data into data that is in the domain name resolution reply packet and that corresponds to the to-be-modified data.

S916. Extract, by using the selected resolution thread, a requested record type and a domain name to be resolved in the cached domain name resolution request packet.

S918. Detect whether a current time point exceeds a cache deadline included in reply data; an if no, proceed to step S920; or if yes, proceed to step S922.

The cache deadline is a validity period of the reply data. A result obtained through domain name resolution and belonging to each record type is changeable. When the current time point exceeds the cache deadline included in the reply data, whether a domain name resolution record that is encapsulated into the reply data has been changed needs to be detected. When the domain name resolution record does not change, the cache deadline included in the reply data is reset.

S920. Obtain, by using the selected resolution thread, a hash value corresponding to the extracted domain name; determine, in a hash table, a linked list corresponding to the hash value; search the linked list for a node that includes the extracted domain name and that corresponds to the extracted record type; extract a cache address of the reply data from the found node; and read corresponding pre-cached reply data from a second cache area based on the cache address.

S922. Update a domain name resolution record, encapsulate the updated domain name resolution record into updated reply data according to a preset reply format, replace pre-cached reply data in a second cache area with the updated reply data, and proceed to step S920.

Specifically, when the current time point exceeds the cache deadline included in the reply data, the domain name resolution server may establish a connection to an authorized domain name server, to detect whether a locally stored domain name resolution record is consistent with a corresponding domain name resolution record stored in the authorized domain name server. If the two records are inconsistent, the locally stored domain name resolution record is updated based on the corresponding domain name resolution record stored in the authorized domain name server, the updated domain name resolution record is encapsulated into the updated reply data according to the preset reply format, and the pre-cached reply data in the second cache area is replaced with the updated reply data.

S924. Obtain, by using the selected resolution thread, a head address pointer of the domain name resolution request packet that is obtained through modification and that is in the first cache area; obtain an address pointer offset corresponding to a total data amount in the domain name resolution request packet obtained through modification; determine a head address pointer of the reply data based on the head address pointer of the domain name resolution request packet obtained through modification and the address pointer offset; and cache the reply data to the first cache area based on the head address pointer of the reply data, to obtain a domain name resolution reply packet that is cached in the first cache area and that includes the domain name resolution request packet obtained through modification and the cached reply data.

In this embodiment, the obtained domain name resolution request packet is stored in the first cache area in the user space, and the cached domain name resolution request packet is resolved in the first cache area by using a single resolution thread, thereby avoiding a waiting process for data exchange processing between threads, and improving the data processing efficiency. The reply data that is searched for is prestored in the second cache area in the user space, and after the reply data is found, the reply data may be directly combined with the domain name resolution request packet obtained through modification, thereby greatly improving the domain name resolution efficiency. In addition, all data required in the domain name resolution process is stored in the cache area in the user space, with no need to read the data from a magnetic disk, thereby greatly improving a data processing speed. In addition, after the reply data is replicated from the second cache area to the first cache area, the domain name resolution process can be completed in the first cache area, thereby effectively reducing the number of data replications, and further improving the domain name resolution efficiency.

Figure 10:
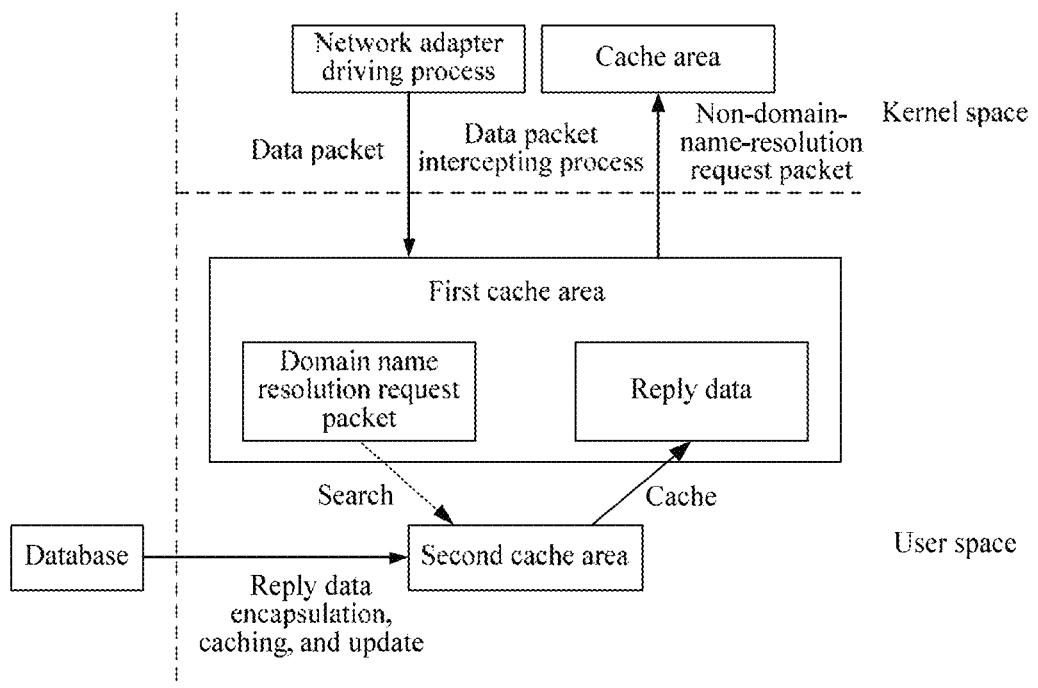
FIG. 10 is a logical diagram of a domain name resolution process according to an embodiment.

FIG. 10 is a logical diagram of a domain name resolution process according to an embodiment. Referring to FIG. 10, system space of a domain name resolution server is divided into kernel space and user space. An operating system kernel may start a data packet intercepting process to transfer a data packet read by a network adapter driving process to the user space. The domain name resolution server caches a domain name resolution data packet to a first cache area in the user space; searches a second cache area in the user space for reply data that belongs to a requested record type and that corresponds to a domain name requesting to be resolved in the domain name resolution data packet; stores the found reply data at a tail of a domain name resolution request packet in the first cache area; and modifies header data of the domain name resolution request packet to obtain a domain name resolution reply packet. A non-domain-name-resolution request packet is fed back to an operating system kernel for responding.

It should be understood that, the steps in the embodiments of this application are not necessarily performed in an order indicated by the step numbers. Unless otherwise clearly noted in this specification, the steps are performed without any strict sequence limit, and may be performed in other orders. In addition, at least some steps in the embodiments may include a plurality of sub-steps or a plurality of stages, and these sub-steps or stages are not necessarily performed at a same moment, and may be performed at different moments. The sub-steps or stages are not necessarily performed in sequence, and the sub-steps or stages and at least some of other steps or sub-steps or stages of other steps may be performed repeatedly or alternately.

Figure 11:
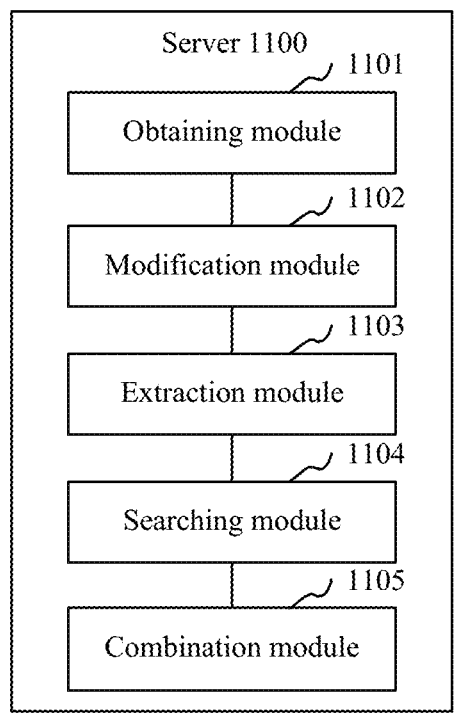
FIG. 11 is a structural block diagram of a server according to an embodiment.

As shown in FIG. 11, in an embodiment, a server 1100 is provided. For an internal structure of the server 1100, refer to the structure shown in FIG. 2. The following modules may all or partially be implemented by software, the hardware, or a combination thereof. Referring to FIG. 11, the server 1100 includes an obtaining module 1101, a modification module 1102, an extraction module 1103, a searching module 1104, and a combination module 1105.

The obtaining module 1101 is configured to obtain a domain name resolution request packet, and cache the obtained domain name resolution request packet to a first cache area.

The modification module 1102 is configured to modify, in the first cache area, header data included in the cached domain name resolution request packet, to obtain header data of a domain name resolution reply packet corresponding to the cached domain name resolution request packet.

The extraction module 1103 is configured to extract a requested record type and a domain name to be resolved in the cached domain name resolution request packet.

The searching module 1104 is configured to search a second cache area for pre-cached reply data that corresponds to the extracted domain name and that belongs to the extracted record type.

The combination module 1105 is configured to combine the pre-cached reply data with the domain name resolution request packet obtained through modification, to obtain a domain name resolution reply packet.

The server 1100 stores the obtained domain name resolution request packet in the first cache area, resolves the cached domain name resolution request packet in the first cache area, modifies the header data included in the domain name resolution request packet into the header data of the corresponding domain name resolution reply packet, and then combines the pre-cached reply data with the domain name resolution request packet obtained through modification, to obtain the domain name resolution reply packet. The reply data that is searched for is prestored in the second cache area, and after the reply data is found, the reply data may be directly combined with the domain name resolution request packet obtained through modification, thereby greatly improving the domain name resolution efficiency. In addition, after the reply data is replicated from the second cache area to the first cache area, the domain name resolution process can be completed in the first cache area, thereby effectively reducing the number of data replications, and further improving the domain name resolution efficiency.

In an embodiment, the obtaining apparatus 1101 is further configured to: obtain, when an operating system kernel reads a data packet from a network adapter receiving queue and transfers the data packet to the user space, a data protocol identifier included in the transferred data packet; and obtain, when the data protocol identifier indicates that the transferred data packet is a domain name resolution request packet, the domain name resolution request packet. In this embodiment, the first cache area and the second cache area are in the user space.

In this embodiment, domain name resolution is directly performed, in the user space, on a data packet that is determined as a domain name resolution request packet without using the kernel space, thereby avoiding a plurality of data replications required during resolution in the kernel space, and improving the domain name resolution efficiency. In addition, a data packet that is determined as a non-domain-name-resolution request packet is fed back to the operating system kernel for responding, thereby providing a manner of processing a data packet that cannot be resolved in the user space, and improving a success rate of data packet resolution.

In an embodiment, the modification module 1102 is further configured to: determine a head address pointer of the domain name resolution request packet cached in the first cache area; determine an address pointer offset of to-be-modified data in the domain name resolution request packet cached in the first cache area, the to-be-modified data being data that is different in the respective header data of the domain name resolution request packet and the domain name resolution reply packet corresponding to the domain name resolution request packet; position the to-be-modified data in the first cache area based on the head address pointer and the address pointer offset; and modify the positioned to-be-modified data into data that is in the domain name resolution reply packet and that corresponds to the to-be-modified data.

In this embodiment, in the first cache area in which the domain name resolution request packet is cached, the header data of the domain name resolution request packet is directly modified into the header data of the domain name resolution reply packet corresponding to the domain name resolution request packet, thereby avoiding real-time encapsulation of the domain name resolution reply packet in a resolution process, reducing a reply time, and further improving the domain name resolution efficiency.

In an embodiment, the searching module 1104 is further configured to: obtain a hash value corresponding to the extracted domain name; determine, in a hash table, a linked list corresponding to the hash value; search the linked list for a node that includes the extracted domain name and that corresponds to the extracted record type; extract a cache address of the reply data from the found node; and read the corresponding pre-cached reply data from the second cache area based on the cache address.

In this embodiment, the hash table is searched for the cache address of the reply data, and then the reply data is read from a cache based on the found address, thereby avoiding a waste of time caused by directly searching each cache for the corresponding reply data, greatly improving a searching rate, and further improving the domain name resolution efficiency.

In an embodiment, the combination module 1105 is further configured to: obtain a head address pointer of the domain name resolution request packet that is obtained through modification and that is in the first cache area; obtain an address pointer offset corresponding to a total data amount in the domain name resolution request packet obtained through modification; determine a head address pointer of the reply data based on the head address pointer of the domain name resolution request packet obtained through modification and the address pointer offset; and cache the reply data to the first cache area based on the head address pointer of the reply data, to obtain a domain name resolution reply packet that is cached in the first cache area and that includes the domain name resolution request packet obtained through modification and the cached reply data.

In this embodiment, in the domain name resolution process, both the domain name resolution request packet and the domain name resolution reply packet are obtained in the first cache area. Provided that the reply data found in the second cache area is replicated to a tail of data included in the domain name resolution request packet in the first cache area, the reply data can be combined with the domain name resolution request packet to obtain the domain name resolution reply packet, thereby improving the domain name resolution efficiency.

Figure 12:
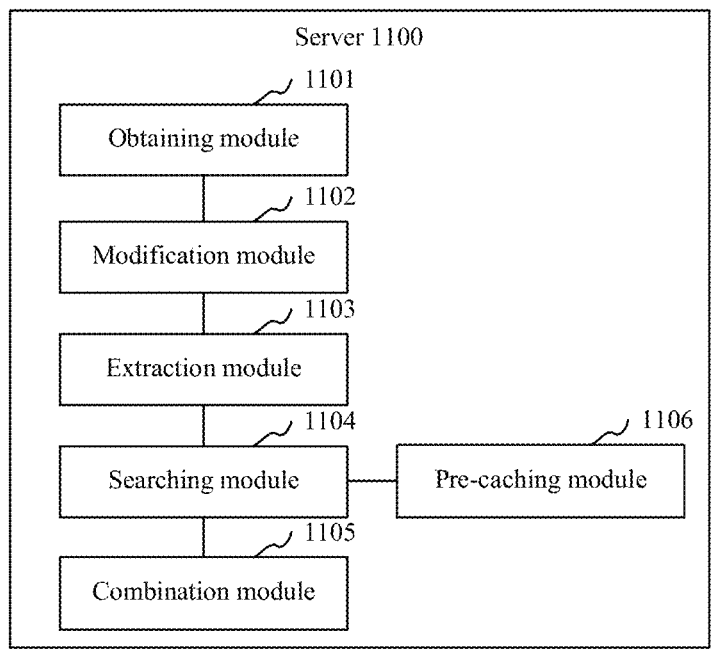
FIG. 12 is a structural block diagram of a server according to another embodiment.

FIG. 12 is a structural block diagram of the server 1100 according to another embodiment. Referring to FIG. 12, the server 1100 further includes a pre-caching module 1106.

The pre-caching module 1106 is configured to: if a current time point exceeds a cache deadline included in the reply data, update the domain name resolution record; encapsulate the updated domain name resolution record into updated reply data according to the preset reply format; and replace the pre-cached reply data in the second cache area with the updated reply data. The reply data is obtained by encapsulating the domain name resolution record according to the preset reply format.

In this embodiment, the obtained domain name resolution request packet is stored in the first cache area in the user space, and the cached domain name resolution request packet is resolved in the first cache area by using a single resolution thread, thereby avoiding a waiting process for data exchange processing between threads, and improving the data processing efficiency. The reply data that is searched for is prestored in the second cache area in the user space, and after the reply data is found, the reply data may be directly combined with the domain name resolution request packet obtained through modification, thereby greatly improving the domain name resolution efficiency. In addition, all data required in the domain name resolution process is stored in the cache area in the user space, with no need to read the data from a magnetic disk, thereby greatly improving a data processing speed. In addition, after the reply data is replicated from the second cache area to the first cache area, the domain name resolution process can be completed in the first cache area, thereby effectively reducing the number of data replications, and further improving the domain name resolution efficiency.

Figure 13:
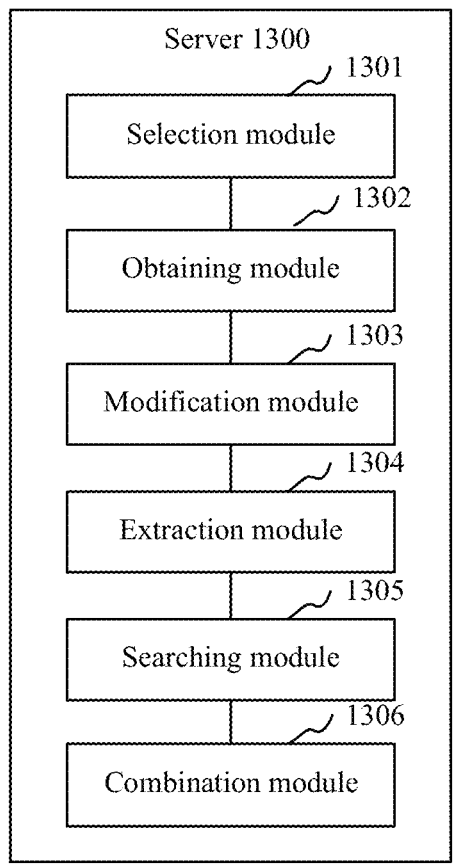
FIG. 13 is a structural block diagram of a server according to still another embodiment.

As shown in FIG. 13, in an embodiment, a server 1300 is provided. For an internal structure of the server 1300, refer to the structure shown in FIG. 2. The following modules may all or partially be implemented by software, the hardware, or a combination thereof. Referring to FIG. 13, the server 1300 includes a selection module 1301, an obtaining module 1302, a modification module 1303, an extraction module 1304, a searching module 1305, and a combination module 1306.

The selection module 1301 is configured to select a resolution thread in idle mode from parallel resolution threads.

The obtaining module 1302 is configured to obtain a domain name resolution request packet by using the selected resolution thread, and cache the obtained domain name resolution request packet to a first cache area.

The modification module 1303 is configured to modify, in the first cache area by using the selected resolution thread, header data included in the cached domain name resolution request packet, to obtain header data of a domain name resolution reply packet corresponding to the cached domain name resolution request packet.

The extraction module 1304 is configured to extract, by using the selected resolution thread, a requested record type and a domain name to be resolved in the cached domain name resolution request packet.

The searching module 1305 is configured to search, by using the selected resolution thread, a second cache area for pre-cached reply data that corresponds to the extracted domain name and that belongs to the extracted record type.

The combination module 1306 is configured to combine, by using the selected resolution thread, the pre-cached reply data with the domain name resolution request packet obtained through modification, to obtain a domain name resolution reply packet.

In this embodiment, the domain name resolution process is independently performed by a resolution thread, without involving data exchange processing performed with other threads, thereby avoiding a waiting process for data exchange processing between threads, and further improving the domain name resolution efficiency.

In an embodiment, the obtaining module 1302 is further configured to: obtain, by using the selected resolution thread when an operating system kernel reads a data packet from a network adapter receiving queue and transfers the data packet to the user space, a data protocol identifier included in the transferred data packet; cache the transferred data packet to a third cache area in the user space by using the selected resolution thread when the data protocol identifier indicates that the transferred data packet is a non-domain-name-resolution request packet; and read the data packet from the third cache area by using a kernel interaction thread independent from the parallel resolution threads, and return the read data packet to the operating system kernel for responding. In this embodiment, the first cache area and the second cache area are in the user space.

In this embodiment, the non-domain-name-resolution request packet that cannot be resolved by the domain name resolution process in the user space is fed back to the operating system kernel for responding, thereby avoiding a failure in resolving the non-domain-name-resolution request packet by the domain name resolution process in the user space, and improving a success rate of data packet resolution.

A person of ordinary skill in the art may understand that all or some of the processes of the methods in the foregoing embodiments may be implemented by a computer program instructing relevant hardware. The program may be stored in a non-volatile computer-readable storage medium. When the program runs, the processes of the foregoing methods in the embodiments are performed. References to the memory, the storage, the database, or other medium used in the embodiments provided in this application may all include a non-volatile or a volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or a cache. By way of description rather than limitation, the RAM may be obtained in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchlink (Synchlink) DRAM (SLDRAM), a rambus (Rambus) direct RAM (RDRAM), a direct rambus dynamic RAM (DRDRAM), and a rambus dynamic RAM (RDRAM).

Technical features of the foregoing embodiments may be randomly combined. To make description concise, not all possible combinations of the technical features in the foregoing embodiments are described. However, as long as combinations of these technical features do not contradict each other, it should be considered that the combinations all fall within the scope recorded by this specification.

The foregoing embodiments only describe several implementations of this application, which are described specifically and in detail, and therefore cannot be construed as a limitation to the patent scope of the present invention. It should be noted that, a person of ordinary skill in the art may make various changes and improvements without departing from the ideas of this application, which shall all fall within the protection scope of this application. Therefore, the protection scope of the patent of this application shall be subject to the appended claims.

What is claimed is:

1. A domain name resolution method performed at a server having one or more processors and memory storing a plurality of programs to be executed by the one or more processors, the method comprising:
   obtaining, by the server, a domain name resolution request packet;
   caching, by the server, the obtained domain name resolution request packet to a first cache area;
   modifying, by the server in the first cache area, header data in the cached domain name resolution request packet, to obtain header data of a domain name resolution reply packet corresponding to the cached domain name resolution request packet;
   extracting, by the server, a requested record type and a domain name to be resolved in the cached domain name resolution request packet;
   searching, by the server, a second cache area for pre-cached reply data that corresponds to the extracted domain name and that belongs to the extracted record type,. further comprising:
   determining, by the server in a hash table, a linked list corresponding to a hash value associated with the extracted domain name;
   searching, by the server, the linked list for a node that comprises the extracted domain name and that corresponds to the extracted record type; and
   reading, by the server, the corresponding pre-cached reply data from the second cache area based on a cache address of the reply data extracted from the found node; and
   combining, by the server, the pre-cached reply data with the domain name resolution request packet obtained through modification, to obtain the domain name resolution reply packet.

2. The method according to claim 1, wherein the first cache area and the second cache area are in user space, and the operation of obtaining, by the server, a domain name resolution request packet comprises:
   obtaining, by the server when an operating system kernel reads a data packet from a network adapter receiving queue and transfers the data packet to the user space, a data protocol identifier in the transferred data packet; and
   obtaining, by the server when the data protocol identifier indicates that the transferred data packet is a domain name resolution request packet, the domain name resolution request packet.

3. The method according to claim 1, further comprising:
   selecting, by the server, a resolution thread in idle mode from parallel resolution threads; and
   performing, by the server by using the selected resolution thread, the steps of: obtaining a domain name resolution request packet, caching the obtained domain name resolution request packet to a first cache area; modifying, in the first cache area, header data in the cached domain name resolution request packet, to obtain header data of a domain name resolution reply packet corresponding to the cached domain name resolution request packet; extracting a requested record type and a domain name to be resolved in the cached domain name resolution request packet; searching a second cache area for pre-cached reply data that corresponds to the extracted domain name and that belongs to the extracted record type; and combining the pre-cached reply data with the domain name resolution request packet obtained through modification, to obtain a domain name resolution reply packet.

4. The method according to claim 3, wherein the first cache area and the second cache area are in user space, and the operation of performing, by the server by using the selected resolution thread, the step of obtaining a domain name resolution request packet comprises:
   obtaining, by the server by using the selected resolution thread when an operating system kernel reads a data packet from a network adapter receiving queue and transfers the data packet to the user space, a data protocol identifier in the transferred data packet;
   caching, by the server, the transferred data packet to a third cache area in the user space by using the selected resolution thread when the data protocol identifier indicates that the transferred data packet is a non-domain-name-resolution request packet; and
   reading, by the server, the data packet from the third cache area by using a kernel interaction thread independent from the parallel resolution threads, and returning the read data packet to the operating system kernel for responding.

5. The method according to claim 1, wherein the operation of modifying, by the server in the first cache area, header data in the cached domain name resolution request packet, to obtain header data of a domain name resolution reply packet corresponding to the cached domain name resolution request packet comprises:
   determining, by the server, a head address pointer of the domain name resolution request packet cached in the first cache area;
   determining, by the server, an address pointer offset of to-be-modified data in the domain name resolution request packet cached in the first cache area, the to-be-modified data being data that is different in the respective header data of the domain name resolution request packet and the domain name resolution reply packet corresponding to the domain name resolution request packet;
   positioning, by the server, the to-be-modified data in the first cache area based on the head address pointer and the address pointer offset; and
   modifying, by the server, the positioned to-be-modified data into data that is in the domain name resolution reply packet and that corresponds to the to-be-modified data.

6. The method according to claim 1, wherein the reply data is obtained by encapsulating a domain name resolution record according to a preset reply format; and
   the method further comprises:
   updating, by the server, the domain name resolution record if a current time point exceeds a cache deadline in the reply data;
   encapsulating, by the server, the updated domain name resolution record into updated reply data according to the preset reply format; and
   replacing, by the server, the pre-cached reply data in the second cache area with the updated reply data.

7. The method according to claim 1, wherein the operation of combining, by the server, the pre-cached reply data with the domain name resolution request packet obtained through modification, to obtain a domain name resolution reply packet comprises:

obtaining, by the server, a head address pointer of the domain name resolution request packet that is obtained through modification and that is in the first cache area;

obtaining, by the server, an address pointer offset corresponding to a total data amount in the domain name resolution request packet obtained through modification;

determining, by the server, a head address pointer of the reply data based on the head address pointer of the domain name resolution request packet obtained through modification and the address pointer offset; and caching, by the server, the reply data to the first cache area based on the head address pointer of the reply data, to obtain a domain name resolution reply packet that is cached in the first cache area and that comprises the domain name resolution request packet obtained through modification and the cached reply data.

8. A server, comprising one or more processors, memory coupled to the one or more processors, and a plurality of computer-readable instructions that, when executed by the one or more processors, cause the server to perform the following operations:

obtaining, by the server, a domain name resolution request packet;

caching, by the server, the obtained domain name resolution request packet to a first cache area;

modifying, by the server in the first cache area, header data in the cached domain name resolution request packet, to obtain header data of a domain name resolution reply packet corresponding to the cached domain name resolution request packet;

extracting, by the server, a requested record type and a domain name to be resolved in the cached domain name resolution request packet;

searching, by the server, a second cache area for pre-cached reply data that corresponds to the extracted domain name and that belongs to the extracted record type, further comprising:

determining, by the server in a hash table, a linked list corresponding to a hash value associated with the extracted domain name;

searching, by the server, the linked list for a node that comprises the extracted domain name and that corresponds to the extracted record type; and reading, by the server, the corresponding pre-cached reply data from the second cache area based on a cache address of the reply data extracted from the found node; and combining, by the server, the pre-cached reply data with the domain name resolution request packet obtained through modification, to obtain the domain name resolution reply packet.

9. The server according to claim 8, wherein the first cache area and the second cache area are in user space, and the operation of obtaining, by the server, a domain name resolution request packet comprises:

obtaining, by the server when an operating system kernel reads a data packet from a network adapter receiving queue and transfers the data packet to the user space, a data protocol identifier in the transferred data packet; and obtaining, by the server when the data protocol identifier indicates that the transferred data packet is a domain name resolution request packet, the domain name resolution request packet.

10. The server according to claim 8, wherein the operations further include:

selecting, by the server, a resolution thread in idle mode from parallel resolution threads; and performing, by the server by using the selected resolution thread, the steps of: obtaining a domain name resolution request packet, caching the obtained domain name resolution request packet to a first cache area; modifying, in the first cache area, header data in the cached domain name resolution request packet, to obtain header data of a domain name resolution reply packet corresponding to the cached domain name resolution request packet; extracting a requested record type and a domain name to be resolved in the cached domain name resolution request packet; searching a second cache area for pre-cached reply data that corresponds to the extracted domain name and that belongs to the extracted record type; and combining the pre-cached reply data with the domain name resolution request packet obtained through modification, to obtain a domain name resolution reply packet.

11. The server according to claim 10, wherein the first cache area and the second cache area are in user space, and the operation of performing, by the server by using the selected resolution thread, the step of obtaining a domain name resolution request packet comprises:

obtaining, by the server by using the selected resolution thread when an operating system kernel reads a data packet from a network adapter receiving queue and transfers the data packet to the user space, a data protocol identifier in the transferred data packet;

caching, by the server, the transferred data packet to a third cache area in the user space by using the selected resolution thread when the data protocol identifier indicates that the transferred data packet is a non-domain-name-resolution request packet; and reading, by the server, the data packet from the third cache area by using a kernel interaction thread independent from the parallel resolution threads, and returning the read data packet to the operating system kernel for responding.

12. The server according to claim 8, wherein the operation of modifying, by the server in the first cache area, header data in the cached domain name resolution request packet, to obtain header data of a domain name resolution reply packet corresponding to the cached domain name resolution request packet comprises:

determining, by the server, a head address pointer of the domain name resolution request packet cached in the first cache area;

determining, by the server, an address pointer offset of to-be-modified data in the domain name resolution request packet cached in the first cache area, the to-be-modified data being data that is different in the respective header data of the domain name resolution request packet and the domain name resolution reply packet corresponding to the domain name resolution request packet;

positioning, by the server, the to-be-modified data in the first cache area based on the head address pointer and the address pointer offset; and modifying, by the server, the positioned to-be-modified data into data that is in the domain name resolution reply packet and that corresponds to the to-be-modified data.

13. The server according to claim 8, wherein the reply data is obtained by encapsulating a domain name resolution record according to a preset reply format; and the method further comprises:

updating, by the server, the domain name resolution record if a current time point exceeds a cache deadline in the reply data;

encapsulating, by the server, the updated domain name resolution record into updated reply data according to the preset reply format; and replacing, by the server, the pre-cached reply data in the second cache area with the updated reply data.

14. The server according to claim 8, wherein the operation of combining, by the server, the pre-cached reply data with the domain name resolution request packet obtained through modification, to obtain a domain name resolution reply packet comprises:

obtaining, by the server, a head address pointer of the domain name resolution request packet that is obtained through modification and that is in the first cache area;

obtaining, by the server, an address pointer offset corresponding to a total data amount in the domain name resolution request packet obtained through modification;

determining, by the server, a head address pointer of the reply data based on the head address pointer of the domain name resolution request packet obtained through modification and the address pointer offset; and caching, by the server, the reply data to the first cache area based on the head address pointer of the reply data, to obtain a domain name resolution reply packet that is cached in the first cache area and that comprises the domain name resolution request packet obtained through modification and the cached reply data.

15. A non-transitory computer readable storage medium storing a plurality of instructions in connection with a server having one or more processors, wherein the plurality of instructions, when executed by the one or more processors, cause the server to perform a plurality of operations including:

obtaining, by the server, a domain name resolution request packet;

caching, by the server, the obtained domain name resolution request packet to a first cache area;

modifying, by the server in the first cache area, header data in the cached domain name resolution request packet, to obtain header data of a domain name resolution reply packet corresponding to the cached domain name resolution request packet;

extracting, by the server, a requested record type and a domain name to be resolved in the cached domain name resolution request packet;

searching, by the server, a second cache area for pre-cached reply data that corresponds to the extracted domain name and that belongs to the extracted record type,. further comprising:

determining, by the server in a hash table, a linked list corresponding to a hash value associated with the extracted domain name;

searching, by the server, the linked list for a node that comprises the extracted domain name and that corresponds to the extracted record type; and reading, by the server, the corresponding pre-cached reply data from the second cache area based on a cache address of the reply data extracted from the found node; and combining, by the server, the pre-cached reply data with the domain name resolution request packet obtained through modification, to obtain the domain name resolution reply packet.

16. The non-transitory computer readable storage medium according to claim 15, wherein the first cache area and the second cache area are in user space, and the operation of obtaining, by the server, a domain name resolution request packet comprises:

obtaining, by the server when an operating system kernel reads a data packet from a network adapter receiving queue and transfers the data packet to the user space, a data protocol identifier in the transferred data packet; and obtaining, by the server when the data protocol identifier indicates that the transferred data packet is a domain name resolution request packet, the domain name resolution request packet.

17. The non-transitory computer readable storage medium according to claim 15, wherein the operations further include:

selecting, by the server, a resolution thread in idle mode from parallel resolution threads; and performing, by the server by using the selected resolution thread, the steps of: obtaining a domain name resolution request packet, caching the obtained domain name resolution request packet to a first cache area; modifying, in the first cache area, header data in the cached domain name resolution request packet, to obtain header data of a domain name resolution reply packet corresponding to the cached domain name resolution request packet; extracting a requested record type and a domain name to be resolved in the cached domain name resolution request packet; searching a second cache area for pre-cached reply data that corresponds to the extracted domain name and that belongs to the extracted record type; and combining the pre-cached reply data with the domain name resolution request packet obtained through modification, to obtain a domain name resolution reply packet.

18. The non-transitory computer readable storage medium according to claim 17, wherein the first cache area and the second cache area are in user space, and the operation of performing, by the server by using the selected resolution thread, the step of obtaining a domain name resolution request packet comprises:

obtaining, by the server by using the selected resolution thread when an operating system kernel reads a data packet from a network adapter receiving queue and transfers the data packet to the user space, a data protocol identifier in the transferred data packet;

caching, by the server, the transferred data packet to a third cache area in the user space by using the selected resolution thread when the data protocol identifier indicates that the transferred data packet is a non-domain-name-resolution request packet; and reading, by the server, the data packet from the third cache area by using a kernel interaction thread independent from the parallel resolution threads, and returning the read data packet to the operating system kernel for responding.

* * * * *